US008180908B2

(12) United States Patent
Zoller et al.

(10) Patent No.: US 8,180,908 B2
(45) Date of Patent: May 15, 2012

(54) PLATFORM FOR STANDARDIZING VEHICLE COMMUNICATIONS WITH THIRD-PARTY APPLICATIONS

(75) Inventors: Peter Zoller, Rosenheim (DE); Andreas Fritsch, Neubiberg (DE); Jens Peter Weiss, Germering (DE); Klaus Kastenmeier, München (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 520 days.

(21) Appl. No.: 11/838,786

(22) Filed: Aug. 14, 2007

(65) Prior Publication Data

US 2009/0045910 A1  Feb. 19, 2009

(51) Int. Cl.
*G06F 15/16* (2006.01)
*G06F 13/00* (2006.01)
*G06F 17/30* (2006.01)
*G08G 1/00* (2006.01)
*H03M 13/00* (2006.01)
*H04W 4/00* (2009.01)
*H04J 3/16* (2006.01)
*G06Q 10/00* (2006.01)

(52) U.S. Cl. ........ 709/229; 709/232; 701/117; 714/752; 370/389; 370/466; 710/35; 707/705; 705/28

(58) Field of Classification Search .......... 709/217–229, 709/232; 707/1; 705/9; 710/35; 370/389; 701/117; 714/752
See application file for complete search history.

(56) References Cited

U.S. PATENT DOCUMENTS

| | | | | |
|---|---|---|---|---|
| 6,006,289 | A * | 12/1999 | James et al. | 710/35 |
| 2004/0122965 | A1* | 6/2004 | Apfel | 709/232 |
| 2005/0190789 | A1* | 9/2005 | Salkini et al. | 370/466 |
| 2006/0171383 | A1* | 8/2006 | Davydov | 370/389 |
| 2007/0208686 | A1* | 9/2007 | Gupta et al. | 707/1 |
| 2008/0004790 | A1* | 1/2008 | Ames | 701/117 |
| 2008/0320358 | A1* | 12/2008 | Pandel et al. | 714/752 |
| 2009/0299805 | A1* | 12/2009 | Baughman et al. | 705/9 |

* cited by examiner

*Primary Examiner* — Ian N Moore
*Assistant Examiner* — Kiet Tang
(74) *Attorney, Agent, or Firm* — Crowell & Moring LLP

(57) ABSTRACT

A business-to-vehicle platform functions as an information technology (IT) integration platform to support secure communication between a vehicle's onboard IT system and any offboard third-party IT system. In one embodiment, the a vehicle's communication hub is decoupled from all voice and data traffic to/from third-party service providers, such that the vehicles will "look and feel" like standard business IT devices to the third-party service providers. In certain embodiments, this decoupling enables the use of standardized business IT services in vehicles, rather than the traditional approach of requiring vehicle-specific embedded services.

24 Claims, 7 Drawing Sheets

PLATFORM FOR STANDARDIZING VEHICLE COMMUNICATIONS WITH THIRD-PARTY APPLICATIONS

FIELD OF THE INVENTION

The present invention relates, in general, to vehicle communications, and more particularly to standardizing vehicle communications with third-party applications.

BACKGROUND OF THE INVENTION

The rate of software-based functions implemented in the automotive industry has been increasing. For example, onboard vehicle systems have been developed in the areas of infotainment, entertainment and telematics. Additionally, some vehicle manufacturers have introduced various online software solutions for vehicles. However, such products are all proprietary in nature, meaning that the supporting information technology (IT) infrastructure is heterogeneous, thereby severely limiting portability, scalability, security and efficiency of the overall solution.

One of the problems inherent in implementing standard business IT in vehicles is the disparity between the lifecycle of business IT (max. 3 years) and the vehicle IT lifecycle (approx. 15 years). By the same token, use of third-party developed technology severely implicates security. There are similar tradeoffs between developing a portable and scalable system, but at the same time implementing it in an efficient manner which does not unreasonably affect vehicle price. Accordingly, there is a need in the art for a business-to-vehicle platform which enables the use of standard business IT systems in vehicles without sacrificing security, scalability, portability and/or efficiency.

BRIEF SUMMARY OF THE INVENTION

Disclosed and claimed herein are methods and vehicle communication platforms for standardizing vehicle communications. In one embodiment, a method includes receiving a vehicle request from an onboard vehicle system to access a third-party application, determining if the onboard vehicle system has access rights associated with the third-party application, and simulating a standard device request to the third-party application corresponding to the vehicle request. The method further includes receiving a standard device response from the third-party application in response to the standard device request, determining a vehicle communication parameter for the onboard vehicle system, and sending a vehicle response to the onboard vehicle system in accordance with the vehicle communication parameter, where the vehicle response corresponding to the standard device response received from the third-party application.

Other aspects, features, and techniques of the invention will be apparent to one skilled in the relevant art in view of the following detailed description of the invention.

DETAILED DESCRIPTION OF EXEMPLARY EMBODIMENTS

Figure 1:
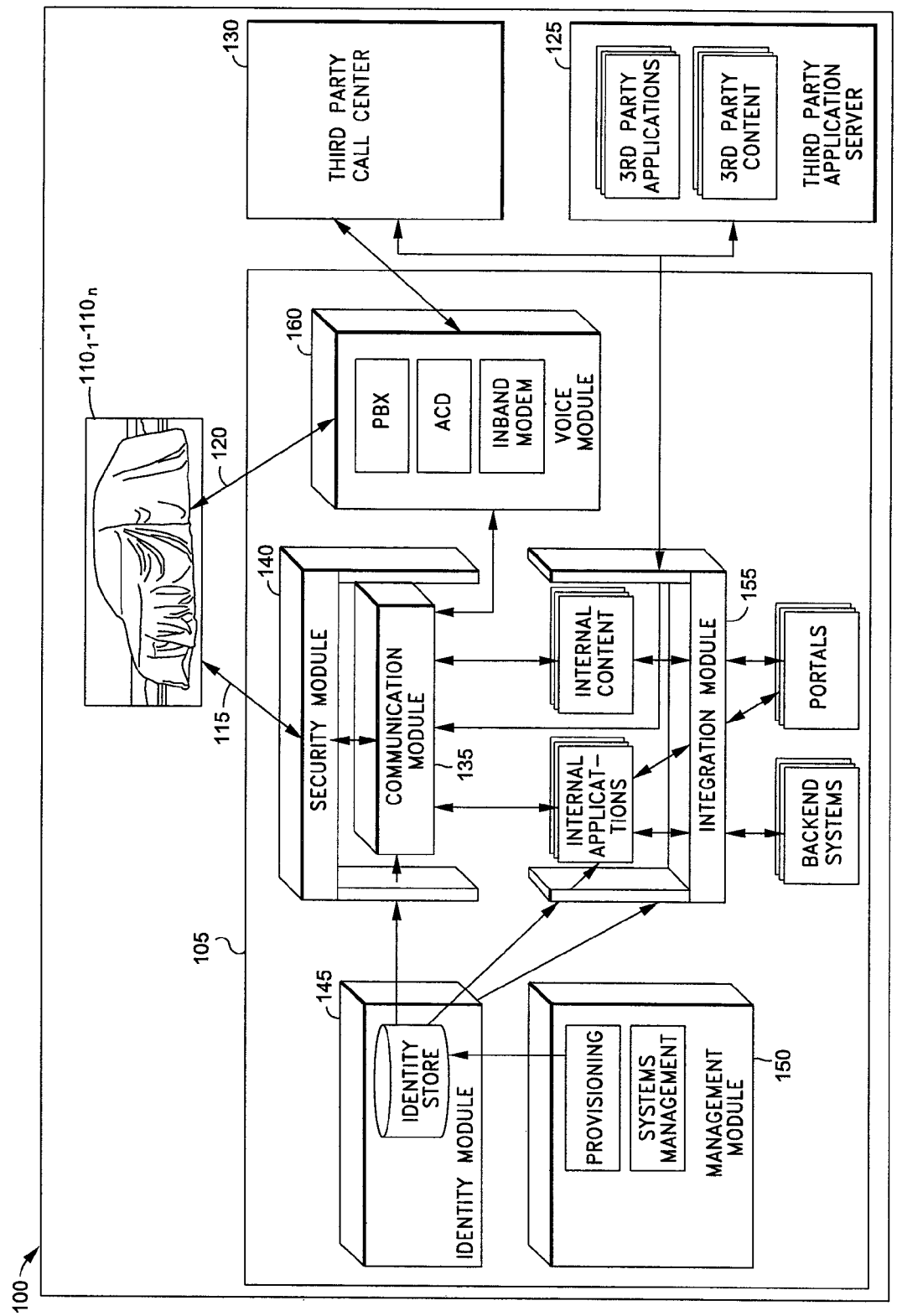
FIG. 1 depicts a block diagram of a platform for standardizing vehicle communications with third-party application servers, according to one embodiment of the invention.

One aspect of the invention is to provide a so-called business-to-vehicle (B2V) platform which functions as an IT integration platform to support secure communication between a vehicle's onboard IT system and any offboard IT system. In one embodiment, the invention may be used to decouple a vehicle's communication hub from all voice and data traffic to/from third-party service providers, such that the vehicles will "look and feel" like standard business IT devices (e.g., laptop, personal computer, personal digital assistant, cellular telephone, etc.) to the third-party service providers. In certain embodiments, this decoupling enables the use of standardized business IT services (call centers, content remote management, etc.) in vehicles, rather than the traditional approach of requiring vehicle-specific embedded services.

In certain embodiments, a platform configured in accordance with the invention may support secure data communication and delivery of vehicle and customer data. The platform may be both scalable and portable in that it may implement both established as well as newly developed technologies and services for virtually a limitless number of vehicles over their entire lifecycle. In certain embodiments, no retrofitting or other modification need be made to the vehicles themselves, thereby minimizing the cost and inconvenience associated with implementing the platform. In this fashion, an older vehicle having an obsolete IT system may be provided with virtually the same functionality and services as is available to new vehicle models. Additionally, since all communication with the vehicle is standardized through the B2V platform, the invention may also enable third party applications and services to be available to any vehicle in the world, regardless of the vehicle's country, nationality of its user and so on.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a non-transitory processor readable medium, which may include any medium that can store information. Examples of the non-transitory processor readable mediums include an electronic circuit, a semiconductor memory device, a read-only memory (ROM), a flash memory or other non-volatile memory, a floppy diskette, a CD-ROM, an optical disk, a hard disk, etc. The term "module" may refer to a software-only implementation, a hardware-only implementation, or any combination thereof. Moreover, the term "third-party application servers" and "third-party applications" may both refer to the physical servers on which a third-party application may execute, or to the third-party application program itself. In addition, the term "third-party applications" may refer to applications which are not developed or otherwise associated with the vehicle systems described herein, or may similarly refer to applications which are associated with such vehicle systems and/or their manufacturers.

Exemplary Embodiments

Referring now to the figures, FIG. 1 depicts an exemplary embodiment of a system 100 for carrying out one or more aspects of the invention. In this embodiment, the system 100 includes a business-to-vehicle (B2V) platform 105 which is configured to communicate with a plurality of onboard vehicle systems $110_1$-$110_n$ over either or both of a data channel 115 and a voice channel 120. While the data channel 115 and voice channel 120 are shown as being separate, it should equally be appreciated that data and voice may be exchanged between the platform 105 and the onboard vehicle systems $110_1$-$110_n$ over a single channel. The B2V platform 105 of FIG. 1 is further configured to communicate with one or more third-party application servers 125 and/or one or more third-party call centers 130.

It should be appreciated that communications between the onboard vehicle system $110_1$-$110_n$ and the platform 105 may be based on any wireless-based standard (e.g., Global System for Mobile communications (GSM), Code Division Multiple Access (CDMA), etc). Similarly, communications between the platform 105 and the third-party application servers 125 and/or one or more third-party call centers 130 may be either wireless, wireline or a combination thereof.

While in certain embodiments, the third-party application servers 125 and call centers 130 may be located on one or more servers which are separate from the platform 105 (or the server hosting the platform), it should equally be appreciated that the third-party application servers 125 and call centers 130 may reside locally with the platform 105. Similarly, such third-party application servers 125 may be operated and maintained independently of the platform 105 and/or the onboard vehicle systems $110_1$-$110_n$, or may be operated in coordination with or by the same party as the platform 105 and/or the onboard vehicle systems $110_1$-$110_n$.

As will be described in more detail below with reference to FIGS. 2-6, the B2V platform 105 further comprises a communication module 135, a security module 140, an identity module 145, a platform management module 150, an integration module 155 and a voice module 160. While details of the integration module 155 are not provided herein, it should be appreciated that the integration module 155 may be comprised of a standard infrastructure for supporting the integration of the third-party applications 125 with both internal vehicle systems, as well as external vehicle systems. Communication is enabled between these modules as shown in FIG. 1. In addition, these modules 135-160 may be configured to implement one or more aspects of the invention, either singularly or in combination.

In one embodiment, the third-party application servers 125 interface with the integration module 155 to provide infotainment, entertainment and/or telematics application services to the platform 105. In addition, the third-party application servers 125 may be internal or external applications in the sense that they may be either local to the platform 105 or remotely-executing applications. Similarly, the third-party call centers 130 may be configured to interface with the integration module 155 and/or voice module 160 to provide various voice-based application services, such as informational or navigational services. In this fashion, and as will be described in more detail below, platform 105 may function as a business IT device simulator from the perspective of the third-party application servers 125 and third-party call centers 130. Thus, the platform 105 may make the onboard vehicle systems $110_1$-$110_n$ appear to be standard IT devices, while providing such third-party services to the vehicles in accordance with the onboard vehicle systems $110_1$-$110_n$ protocols and communication standards.

Figure 2:
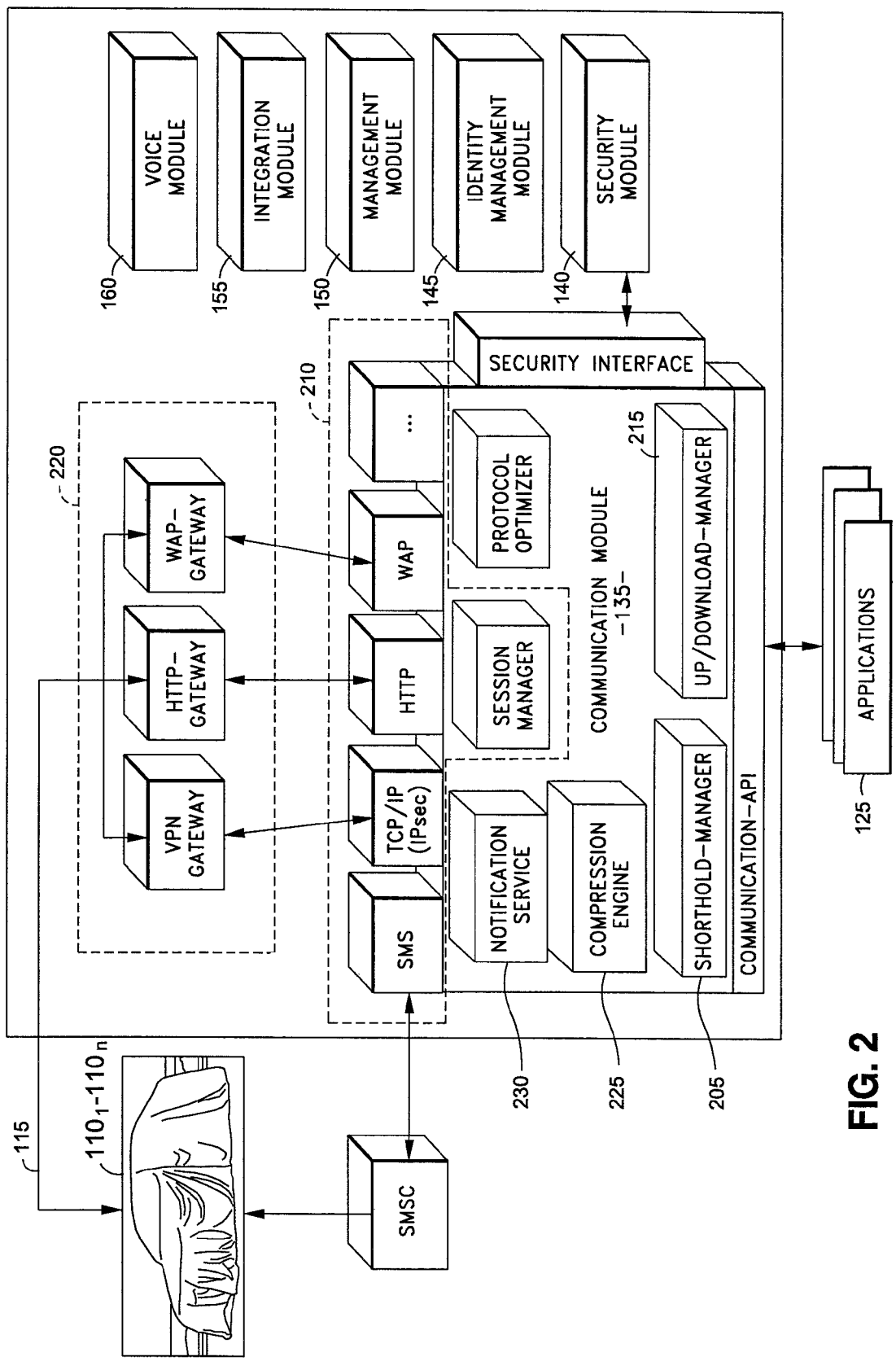
FIG. 2 depicts a block diagram of a communication module of the platform of FIG. 1, according to one embodiment of the invention.

FIG. 2 is a block diagram of one embodiment of the communication module 135 of FIG. 1. In particular, communication module 135 exchanges data with the onboard vehicle systems $110_1$-$110_n$ over data channel 115. Similarly, communication is enabled to the third-party application servers 125, as previously described in FIG. 1.

The communication module 135 may include a shorthold manager 205 configured to simulate an active connection to a third party application server 125 or call center 130 in the event that the vehicle temporarily loses the actual physical connection. By way of example, a vehicle entering a tunnel may temporarily lose an active connection to a third-party application 125. Rather than simply terminating the session, the shorthold manager 205 may be used to detect this fact, and then simulate a persistent connection from the perspective of the third-party application until the vehicle exits the tunnel and re-establishes the true physical connection. Thus, the shorthold manager 205 effectively simulates the connection that the third-party application 125 would expect to have to a standard IT device.

The communication module 135 may further include a plurality of communication sub-modules configured to provide functionalities like session management, data compression or protocol optimization. These services encapsulate the technical infrastructure components and thus make changes in the communication infrastructure transparent for the applications. By way of example, seamless roaming modules 210 comprise a session manager and a plurality of communication modules. As onboard vehicle systems $110_1$-$110_n$ are in operation, they may tend to move in and out of various types of wireless coverage areas, and hence use different gateways 220 to access available services. This may have the effect of switching which wireless standard(s) the vehicle is using to communicate at any given time, possibly even during an active session. However, third-party applications 125 are typically not configured to handle such switches during active sessions. To that end, the seamless roaming modules 210 may be used to manage changes at the physical-connection-level between the vehicle and the platform (e.g., B2V platform 105) such that the third-party application 125 is oblivious to such changes, and continues to transfer data to/from the onboard vehicle systems $110_1$-$110_n$ as if a static and persistent connection is being maintained. In this fashion, the communication module 105 functions to decouple the physical connection(s) between the vehicles and the platform (e.g., platform 105), from the connection between the third-party application server(s) 125 and the platform.

Continuing to refer to FIG. 2, the communication module 135 further includes an upload/download manager 215. In one embodiment, manager 215 may be configured to process larger blocks of data transfer between the third-party application servers 125 and the onboard vehicle systems $110_1$-$110_n$. In one embodiment, the upload/download manager 215 may be configured to transfer large blocks of data which are received as a series of smaller separate pieces. By way of a non-limiting example, certain third-party applications 125 may expect to receive data in larger blocks at one time. However, the onboard vehicle systems $110_1$-$110_n$ may not be configured to handle large data transfers, either because of the lack of a persistent connection, the available bandwidth of the connection, etc. In this case, the upload/download manager 215 may wait to receive a series of smaller data blocks from the vehicle before sending the combined larger block as may be expected by the third-party applications 125. Thus, data transfers to and from the onboard vehicle systems $110_1$-$110_n$ will appear to the third-party applications 125 as if they are being made by a standard business IT device (e.g., PC, PDA, etc.).

The communication module 135 further includes a compression engine 225, which may be configured to compress data that is to be sent to the onboard vehicle systems $110_1$-$110_n$, as a function of the quality of the connection 115, according to one embodiment. That is, a low bandwidth connection 115 may necessitate that data be compressed before being sent to the onboard vehicle systems $110_1$-$110_n$. However, the third-party applications 125 may not be configured to perform data compression, or may not expect to have to compress the data. Thus, the compression engine 225 may effectively decouple any needed data compression from the expectations and/or capabilities of the third-party applications 125.

Finally, the notification service module 230 may be used when a third-party application 125 wants contact one of the onboard vehicle systems $110_1$-$110_n$, or otherwise initiate communicate with one of the onboard vehicle systems $110_1$-$110_n$. Rather than the third-party applications 125 having to know all of the specific communication protocols used by the vehicles, the third-party applications 125 may contact the B2V platform as they would any standard IT device, and receive a response as expected, either from a vehicle following a notification sent by the notification service module 230, or from the platform itself.

Figure 3:
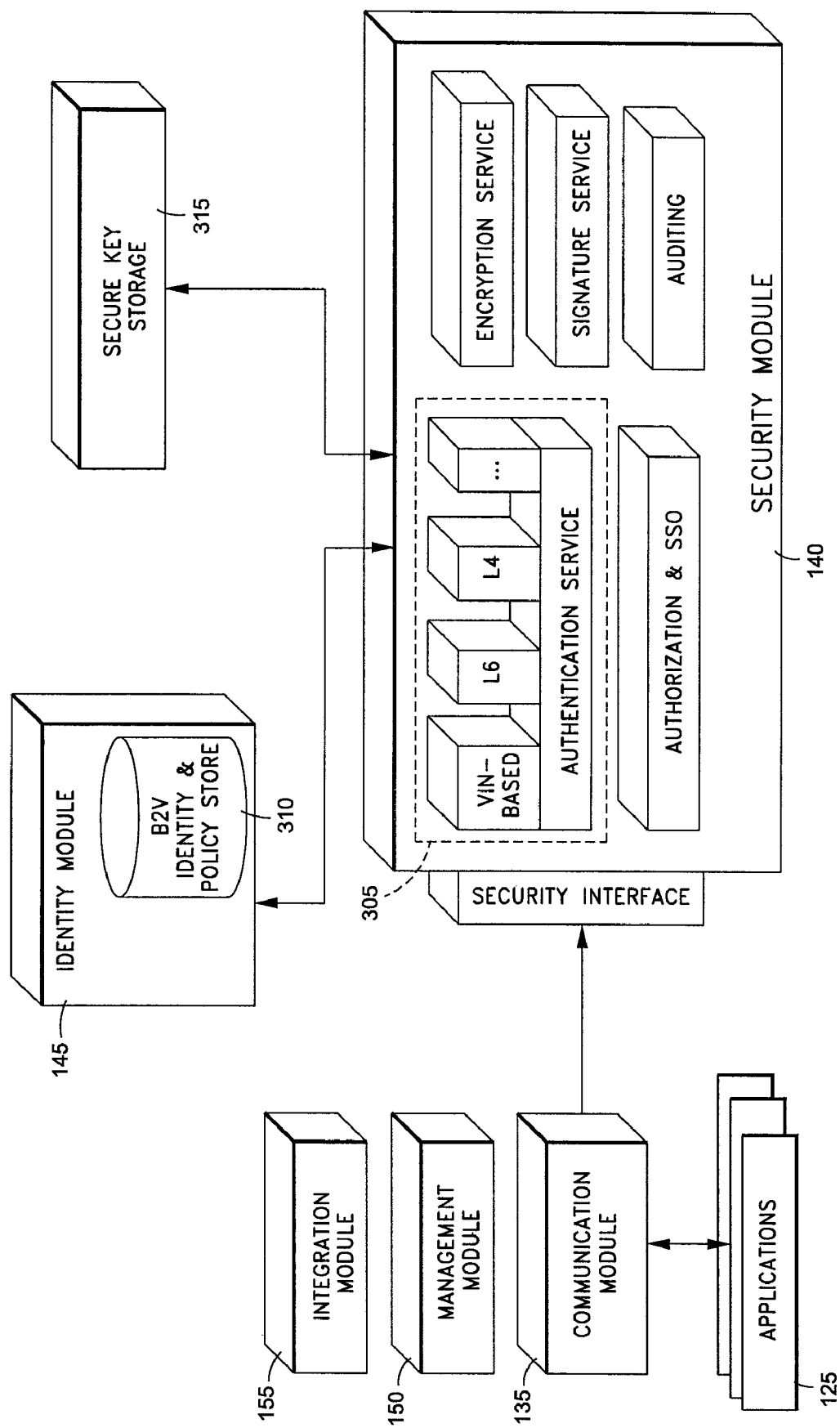
FIG. 3 depicts a block diagram of a security module of the platform of FIG. 1, according to one embodiment of the invention.

Referring now to FIG. 3, depicted is one embodiment of the security module 140 of FIG. 1. In particular, the security module 140 comprises an authentication service module 305 which cares for vehicle authorization and authentication based on the type of vehicle. However, third-party applications 125 are not typically configured to tailor their authentication measures beyond the standard variants. Thus, in order to be scalable across both new vehicles as well as older vehicles, it may be desirable for the platform to select and implement whatever security measures happen to be available for a particular type of vehicle. For example, a simply VIN-based authorization may be the only form of authentication available for a given vehicle based on the vehicles make, year, etc. Similarly, the vehicle manufacturer may have implemented a proprietary security infrastructure. Rather than require third-party applications developers to customize their applications for every possible vehicle authentication type, one aspect of the invention is to decouple the security measures required/permitted by the third-party applications 125 from the available security measures for the target vehicle. In one embodiment, authorization and authentication may be made available by the security module 140 for vehicles, customers and/or applications.

It should further be appreciated that the third-party applications 125 may be accessed via the vehicle or via an different network portal, such as an Internet portal. Moreover, the variety of authentication mechanisms may include simple schemes based on vehicle attributes, as well as complex schemes based on cryptographic challenge response protocols. To that end, it should further be appreciated that some implementations may offer a single sign-on capability for different third-party applications 125, and that the authentication level can be upgraded by following authentication calls.

In another embodiment, each available application or service may require a contract or other means of indicating the vehicle (or the user in the vehicle) is permitted to access the desired application or service. Rather than require each third-party applications 125 from having to determine whether the vehicle/user is authorized for the particular requested application/service, the security module 140 may interact with the identity module 145 to identify the user, and then access a policy database 310 which may contain subscription information for vehicle, or otherwise indicate what applications or services the vehicle (or the user in the vehicle) is permitted to access. In this fashion, the security module 140 may function to release third-party applications from the responsibility of the entire authentication and authorization process.

The security module 140 may also include encryption services, signature services, auditing services and so on, as depicted in FIG. 3. Finally, a separate secure key storage 315 is depicted, and may be used to operations on private keys for implementing the operation of the previously-described authentication service module 305.

Figure 4:
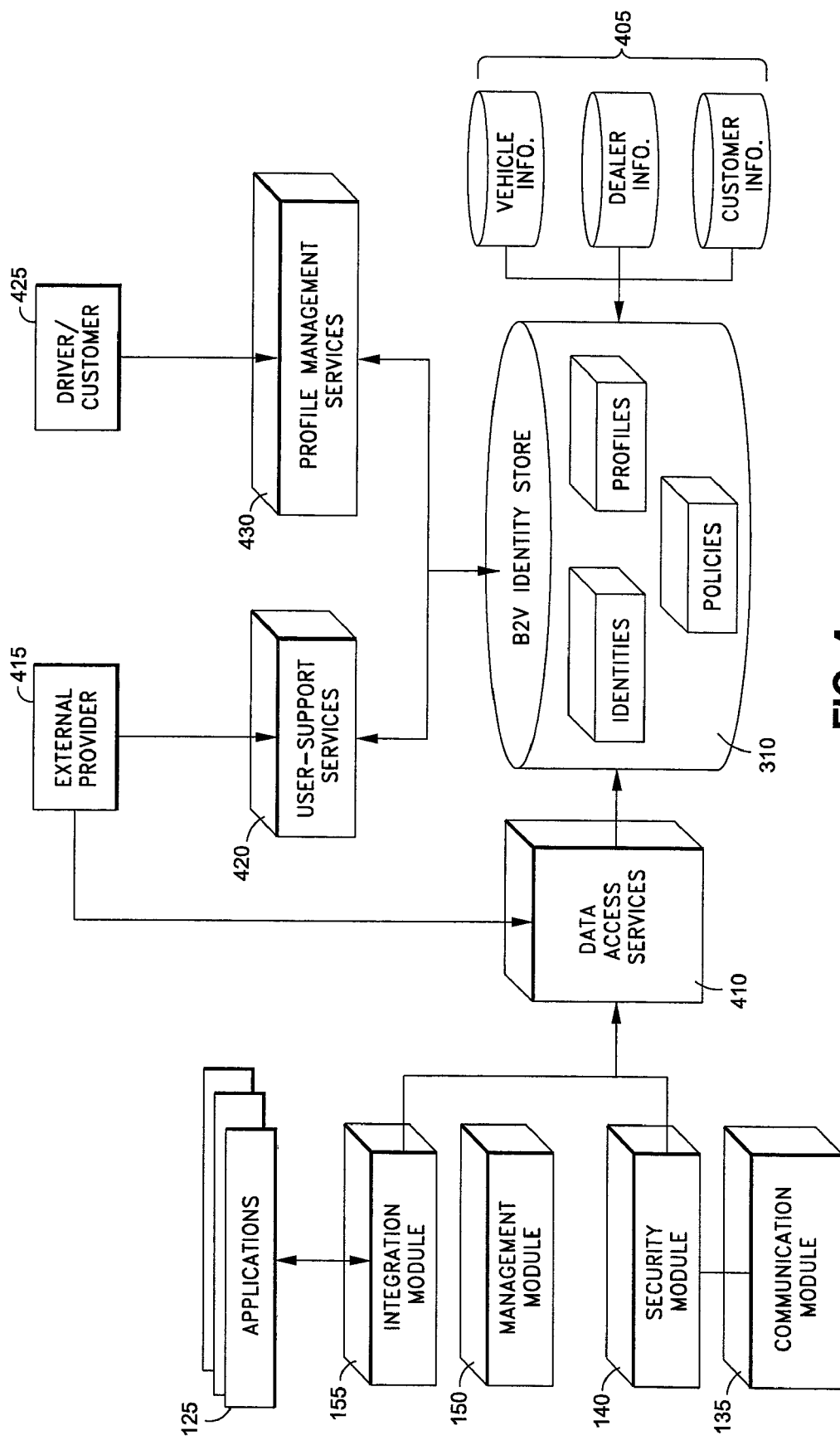
FIG. 4 depicts a block diagram of an identity module of the platform of FIG. 1, according to one embodiment of the invention.

FIG. 4 is one embodiment of a block diagram for an identity module 145 of FIG. 1 configured in accordance with the principles of the invention. As shown, the identity module 145 contains the previously-described identity database 310. In addition, the identity module 145 may be connected (or otherwise have access) to one or more master databases 405 which contain manufacturer-controlled vehicle information, dealer information, and customer information. Since this information tends to be sensitive, manufacturers are not likely to permit direct access to these master databases 405. As such, the identity database 310 may be configured to collect only that specific information needed to perform the authentication and authorization operations described above by the security module 140. For example, the identity database 310 may contain identity information, which is information relating to the vehicle or customer information. The identity database 310 may also contain policy information (e.g., user access rights, access rules, etc.), as well as user profile information (e.g., customer-specific information, vehicle configuration data, user preference data, etc.).

In certain embodiments, it may be desirable to provide external providers 415 with access to certain portions of the identity database 310, such as for providing technical support or other user help features. To that end, rather than allowing direct access to the identity database 310, the data access service module 410 may be used as a machine-to-machine interface whereby limited access to the identity database 310 is available to such external providers 415. In one embodiment, the external providers 415 may be third-party application developers, for example, requiring certain support services. Similarly, the user-support services module 420 may provide external providers 415 with human-to-machine access to the identity database 310, such as through a web browser interface.

On the other hand, vehicle users may also desire to access the identity database 310, such as to update user profile and/or preference information. To that end, the profile management module 430 may be used to enable web-based access to limited portions of the identity database 310. In this fashion, operations relating to user identity, access rights and preference data may all be managed by the platform itself, and completely decoupled from the third-party applications 125 being invoked by the users.

Figure 5:
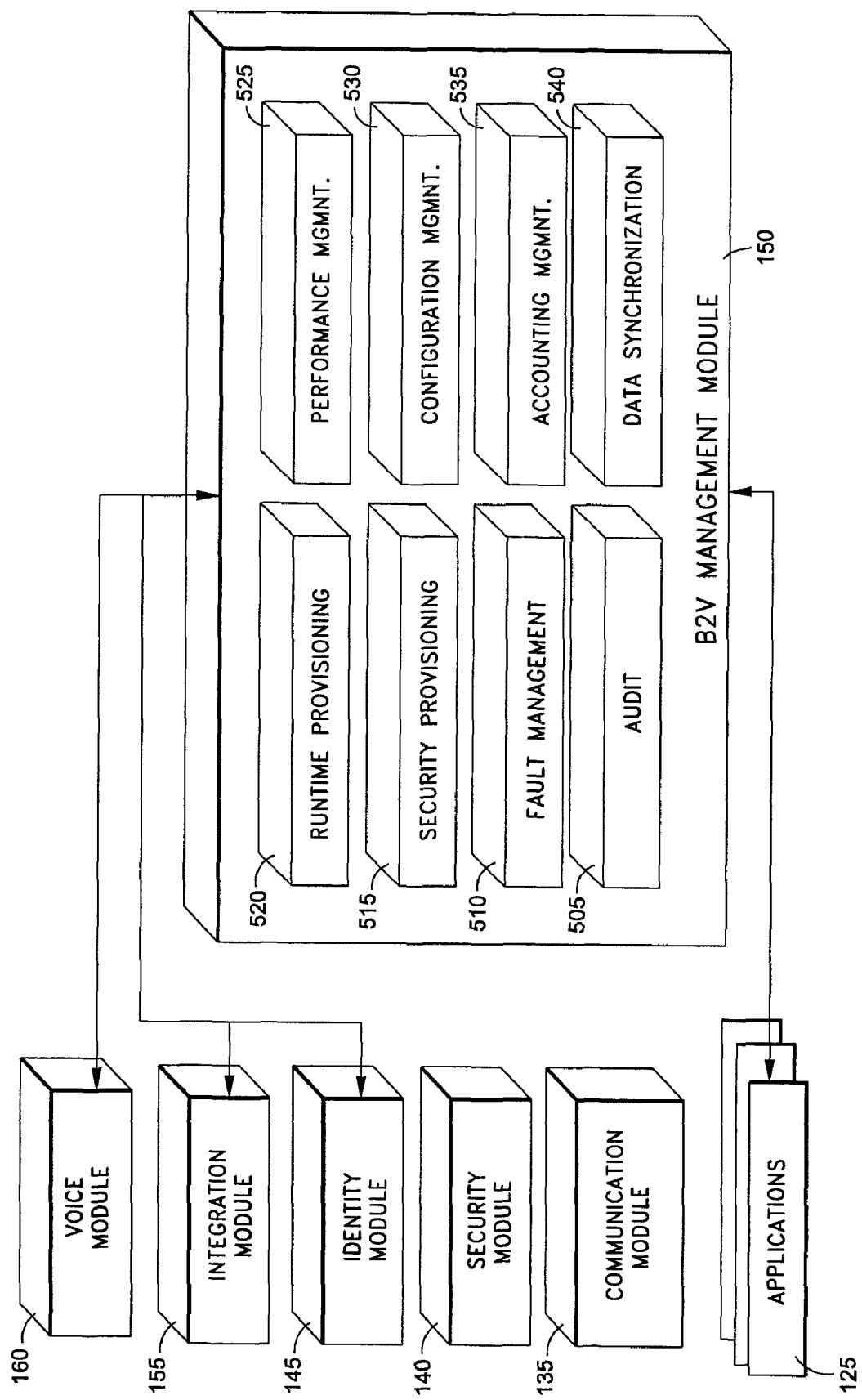
FIG. 5 depicts a block diagram of a management module of the platform of FIG. 1, according to one embodiment of the invention.

Referring now to FIG. 5, depicted is one embodiment of the management module 150 of FIG. 1 configured to provide a variety of platform management services. For example, the audit module 505 may be used to track certain or all actions on the B2V platform, thereby functioning as a central log. The fault management module 510 may be used to manage rules and procedures in the event that a platform component fails, or some other error is detected. The security provisioning module 515 functions as an interface for re-configuring of platform security policies. Additionally, the runtime provisioning module 520 may be used to provide information to the vehicle indicating which B2V platform to connect to (e.g., in an international implementation), as well as how to connect to the desired B2V platform.

The management module 150 is further depicted as including a performance management module 525 (e.g., manages system performance), a configuration module 530 (e.g., manages platform configurations), accounting module 535 (e.g., manages data relating to service fees and billing), and a data synchronization module 540 (e.g., manages data synchronization between internal and external databases).

It should of course be appreciated that the management module 150 of FIG. 5 is but one embodiment, and that other embodiments may have fewer or additional modules for performing general B2V platform management functions.

Figure 6:
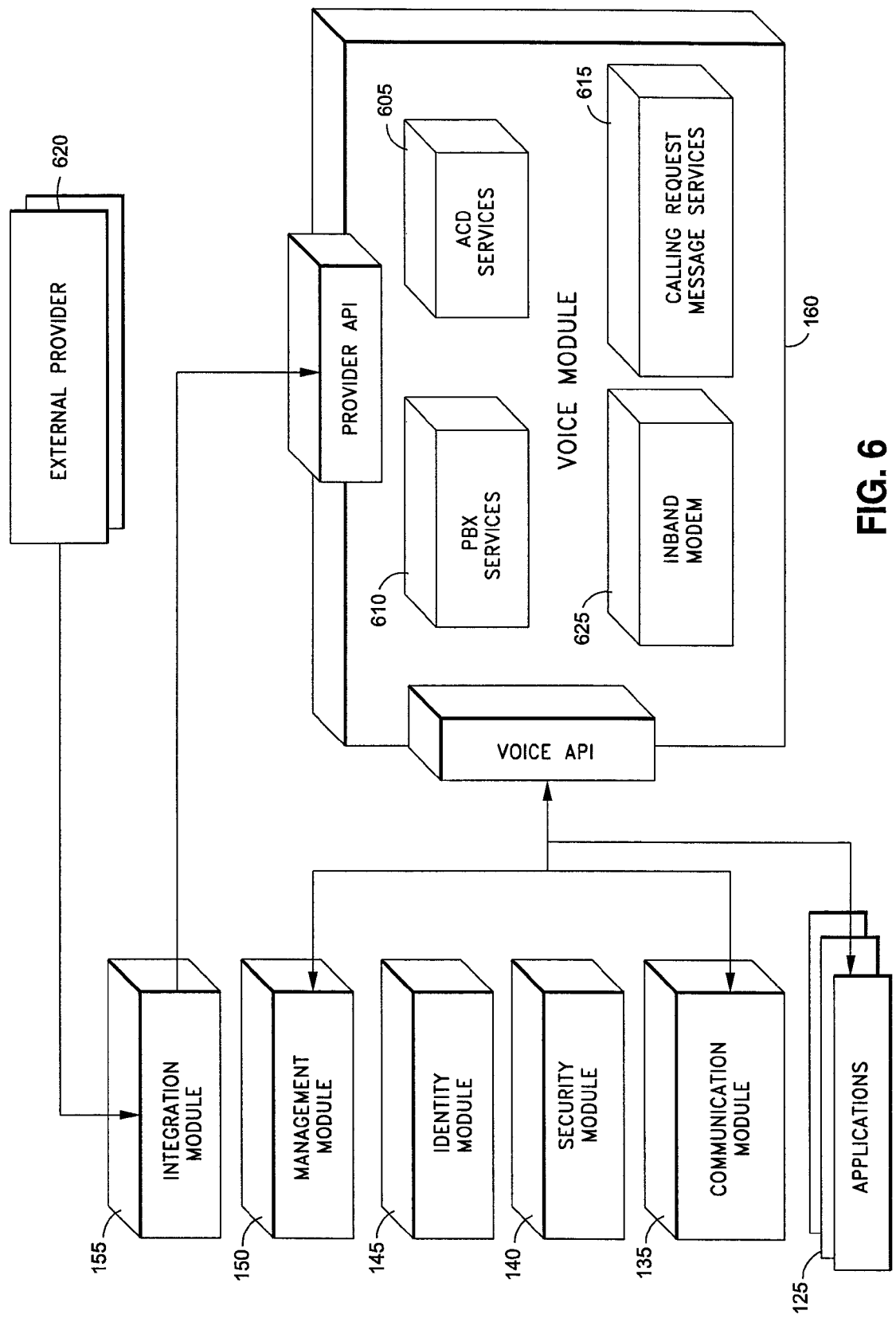
FIG. 6 depicts a block diagram of a voice module of the platform of FIG. 1, according to one embodiment of the invention.

FIG. 6 depicts a block diagram of one embodiment of the voice module 160 of FIG. 1. In addition to decoupling the data transmissions to and from a vehicle as described above, another aspect of the invention is to provide a B2V platform having a voice module 160 which may facilitate standardization of various voice-based services (e.g., emergency calls). In one embodiment, the voice module 160 may function to direct a vehicle voice call to an appropriate call center (e.g., third-party call center 130) using an automatic call distribution (ACD) module 605. The ACD module 605 may contain logic for routing calls based on one or more parameters, such as user's nationality, type of vehicle, country the vehicle is located in, etc. By way of example, in the event a vehicle is in an accident, the vehicle may collect and send a set of data (e.g., airbags deployment, GPS position, etc.) to a backend application (e.g., third-party application 125) using, for example, inband modem 625 or communication module 135. Additionally, this data may be used by the ACD module 605 to determine which call center should be used to attempt a voice connection to the user who just had the accident.

In another example, a vehicle's user may establish an information call with a call center, after having been routed to an appropriate call center by the ACD module 605. The information requested by the user (e.g., restaurant, hotel, etc.) may then be processed through the voice module 160 and sent to the vehicle (e.g., navigation system) using, for example, inband modem 625 or communication module 135. Similarly, the voice processing may require certain PBX functionality (e.g., provided by the PBX services module 610), and messaging services (e.g., provided by calling request message services module 615). The actual cellular is provided by external provider 620, which may be any cellular-based provider. In short, the voice module 605 may function to standardize vehicle voice communications by decoupling the various available voice services from the vehicle itself.

Figure 7:
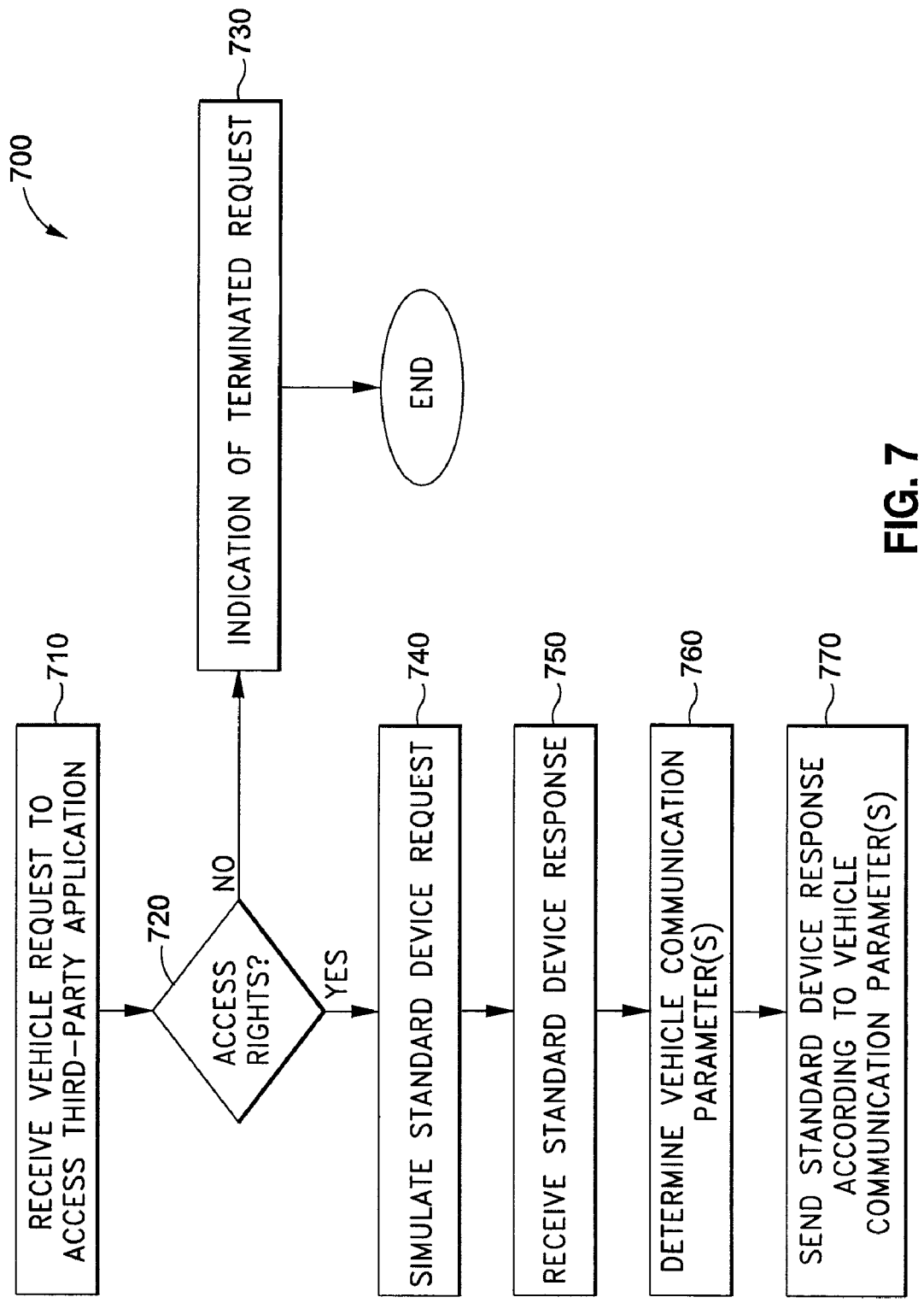
FIG. 7 is a process for implementing one or more aspects of the invention in accordance with one embodiment.

Referring now to FIG. 7, depicted is one embodiment of a process performed by a B2V platform to implement one or more aspects of the invention. In particular, process 700 begins at block 710 with a request to access some third-party application (e.g., third-party applications 125) being received from an onboard vehicle system (e.g., one of the plurality of onboard vehicle systems $110_1$-$110_n$). It should be appreciated that the request of block 710 may be received by a platform, such as the platform 105 of FIG. 1. Such request may be a request for data and/or service (e.g., infotainment, entertainment, telematics, etc.) provided by some third-party application server. It should further be appreciated that the request may be received by the platform from the onboard vehicle system over any wireless connection.

Once a request is received, process 700 may continue to block 720 where a determination may be made (e.g., by the security module 140 of FIG. 3) as to whether the onboard vehicle system (or its user) has the requisite access rights for the requested third-party application. If not, process may continue to block 730 where the onboard vehicle system is notified of the fact that the request will not be processed due to a lack of access rights. If, on the other hand, the onboard vehicle system does have the necessary access rights, process 700 moves to block 740, At block 740, a data/service request, which corresponds to the request received at block 710, may be simulated by the platform as if it originated from a standard business electronic device, such as a PC, laptop, PDA, etc. In certain embodiments, the third-party application may not even be able to tell that the request is being issued by a system which is not a standard business IT system. While in one embodiment, the operation of block 740 may be performed by the communication module 135 of FIG. 2, it should equally be appreciated that one or more of the other modules of the platform 105 may similarly be used in performing this operation (e.g., identity module 145). In short, the simulation operation of block 740 may decouple the request made form the onboard vehicle system from the request which is actually provided to the third-party application server.

Continuing to refer to FIG. 7, since the third-party application received what it believes to be a standard IT device request, the request will be processed as if it were in fact from a standard device. To that, a standard device response will be received from the third-party application at block 750. It should be appreciated that the response may include any form of data which is responsive or related to the request of block 710 above.

As the onboard vehicle system is not a standard business IT device, the standard device response received at block 750 may not be sent directly to the onboard vehicle system. Rather, one or more vehicle communication parameters may need to be determined first (block 760). It should equally be appreciated that the determination of block 760 may occur at an earlier point in process 700, so long as it occurs prior to communicating the response back to the onboard vehicle system. In one embodiment, the vehicle communication parameters may be based on one or more of vehicle make and model, vehicle year, vehicle's country, user's nationality, available wireless communication channels, user preference data, etc.

Once the vehicle communication parameters have been determined at block 760, process 700 may continue to block 770 where a response to the request of block 710 may be sent back to the onboard vehicle system in accordance with the vehicle communication parameter. In one embodiment, the response of block 770 corresponds to the standard device response received from the third-party application, but formatted for the particular communication requirements of the onboard vehicle system. In this fashion, communication may be enabled between a third-party application and a vehicle without the third-party application having to perform any additional processing beyond what is required for communication with a standard IT device.

While process 700 describes a single request/response transaction, it should be appreciated that numerous individual requests and corresponding responses may (and likely will) occur between the onboard vehicle system and the third-party application in question. Moreover, references to 'third-party applications' in process 700, as well as throughout this disclosure, should be interpreted to refer to applications which are developed and/or maintained independently of the described onboard vehicle systems, or may similarly be developed and/or maintained in coordination with or by the same party as that which developed and/or maintains the onboard vehicle systems described herein.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for standardizing vehicle communications comprising the acts of:
   receiving, over a first network connection, a non-standard information technology (IT) device request from an onboard vehicle system to access a third-party application, wherein the first network connection is a wireless network connection;
   simulating, over a second network connection, a standard IT device request to the third-party application corresponding to the non-standard IT device request, and wherein said simulating does not dependent on the particular third-party application for which the standard IT device request is being simulating;
   receiving, over the second network connection, a standard IT device response from the third-party application in response to the standard IT device request;
   determining a vehicle communication parameter for said onboard vehicle system;
   detecting that the first network connection has been temporarily lost and, in response thereto, simulating to the third-party application over the second network connection that the first network connection is still active;
   sending, over the first network connection once it has been reestablished, a non-standard IT device response to the onboard vehicle system in accordance with the vehicle communication parameter, wherein the non-standard IT device response corresponds to the standard IT device response received from the third-party application;
   receiving a series of data transfers from the onboard vehicle system intended for the third-party application; and
   transmitting the series of data transfers as a single block data transfer to the third-party application, wherein the single block data transfer corresponds to how a the third-party application expects to receive data from a standard IT device rather than an onboard vehicle system.

2. The method of claim 1, wherein the third-party application is an application selected from the list consisting of infotainment, entertainment and telematics.

3. The method of claim 1, wherein the vehicle communication parameter is based on a proprietary communication protocol for the onboard vehicle system.

4. The method of claim 1, further comprising formatting the standard IT device response in accordance with the vehicle communication parameter.

5. The method of claim 1, further comprising detecting a change in the first network connection to the onboard vehicle system from a first wireless standard to a second wireless standard, and wherein said change does not alter a persistent connection with the third-party application.

6. The method of claim 1, further comprising the acts of:
   detecting a vehicle authentication measure of the onboard vehicle system based on at least one of a type and year of manufacture of the onboard vehicle system; and
   authenticating the onboard vehicle system to access the third-party application in accordance with the detected vehicle authentication measure.

7. The method of claim 1, wherein the third-party application comprises a voice-based service, and wherein the vehicle request comprises a voice-based request to access the voice-based service.

8. A vehicle communication platform comprising:
   a first network interface configured to establish a first communicate link with an onboard vehicle system;
   a second network interface configured to establish a second communication link to a third-party application;
   a memory containing computer-executable instructions; and
   a processor, coupled to the first network interface, the second network interface and to the memory, wherein the processor is configured to execute the computer-executable instructions to:
      receive a non-standard information technology (IT) device request over the first communication link from the onboard vehicle system to access the third-party application where the first communication link is a wireless communication link,
      simulate a standard IT device request over the second communication link to the third-party application corresponding to the non-standard IT device request, and wherein the simulation does not dependent on the particular third-party application for which the standard IT device request is being simulating,
      receive a standard IT device response over the second communication link from the third-party application in response to the standard IT device request,
      determine a vehicle communication parameter for said onboard vehicle system, detect that the first communication link has been temporarily lost and, in response thereto, simulating to the third-party application over the second communication link that the first communication link is still active, send a non-standard IT device response to the onboard vehicle system over the first communication link in accordance with the vehicle communication parameter, wherein the non-standard IT device response corresponds to the standard IT device response received from the third-party application, receive a series of data transfers from the onboard vehicle system over the first communication link intended for the third-party application, and transmit the series of data transfers as a single block data transfer over the second communication link to the third-party application, wherein the single block data transfer corresponds to how a the third-party application expects to receive data from a standard IT device rather than an onboard vehicle system.

9. The vehicle communication platform of claim 8, wherein the third-party application is an application selected from the list consisting of infotainment, entertainment and telematics.

10. The vehicle communication platform of claim 8, wherein the vehicle communication parameter is based on a proprietary communication protocol for the onboard vehicle system.

11. The vehicle communication platform of claim 8, wherein the processor is further configured to execute the computer-executable instructions to format the standard IT device response in accordance with the vehicle communication parameter.

12. The vehicle communication platform of claim 8, wherein the processor is further configured to execute the computer-executable instructions to detect a change in the first communication link to the onboard vehicle system from a first wireless standard to a second wireless standard, where said change is unknown to the third-party application.

13. The vehicle communication platform of claim 8, wherein the processor is further configured to execute the computer-executable instructions to:

detect a vehicle authentication measure of the onboard vehicle system based on at least one of a type and year of manufacture of the onboard vehicle system; and authenticate the onboard vehicle system to access the third-party application in accordance with the detected vehicle authentication measure.

14. The vehicle communication platform of claim 8, wherein the third-party application comprises a voice-based service, and wherein the vehicle request comprises a voice-based request to access the voice-based service.

15. A computer program product, comprising:

a non-transitory processor readable medium having processor executable code embodied therein for standardizing vehicle communications, the non-transitory processor readable medium having:

processor executable program code to receive, over a first network connection, a non-standard information technology (IT) device request from an onboard vehicle system to access a third-party application, wherein the first network connection is a wireless network connection;

processor executable program code to simulate, over a second network connection, a standard IT device request to the third-party application corresponding to the non-standard IT device request, and wherein the simulation does not dependent on the particular third-party application for which the standard IT device request is being simulating;

processor executable program code to receive, over the second network connection, a standard IT device response from the third-party application in response to the standard IT device request;

processor executable program code to determine a vehicle communication parameter for said onboard vehicle system;

processor executable program code to detect that a connection to the onboard vehicle system has been temporarily lost and, in response thereto, simulate to the third-party application that the connection is still active;

processor executable program code to send, over the first network connection once it has been reestablished, a non-standard IT device response to the onboard vehicle system in accordance with the vehicle communication parameter, wherein the non-standard IT device response corresponds to the standard IT device response received from the third-party application;

processor executable program code to receive a series of data transfers from the onboard vehicle system intended for the third-party application: and processor executable program code to transmit the series of data transfers as a single block data transfer to the third-party application, wherein the single block data transfer corresponds to how a the third-party application expects to receive data from a standard IT device rather than an onboard vehicle system.

16. The computer program product of claim 15, wherein the third-party application is an application selected from the list consisting of infotainment, entertainment and telematics.

17. The computer program product of claim 15, wherein the vehicle communication parameter is based on a proprietary communication protocol for the onboard vehicle system.

18. The computer program product of claim 15, wherein the non-transitory processor readable medium further includes processor executable program code to format the standard IT device response in accordance with the vehicle communication parameter.

19. The computer program product of claim 15, wherein the non-transitory processor readable medium further includes processor executable program code to detect a change in the first network connection to the onboard vehicle system from a first wireless standard to a second wireless standard, and wherein said change does not alter a persistent connection with the third-party application.

20. The computer program product of claim 15, wherein the non-transitory processor readable medium further includes:

processor executable program code to detect a vehicle authentication measure of the onboard vehicle system based on at least one of a type and year of manufacture of the onboard vehicle system; and processor executable program code to authenticate the onboard vehicle system to access the third-party application in accordance with the detected vehicle authentication measure.

21. The computer program product of claim 15, wherein the third-party application comprises a voice-based service, and wherein the vehicle request comprises a voice-based request to access the voice-based service.

22. The method of claim 1, wherein detecting that the first network connection has been temporarily lost comprises detecting that all network connectivity to the onboard vehicle computer has been temporarily lost and, in response thereto, simulating to the third-party application over the second network connection that the first network connection is still active.

23. The vehicle platform of claim 8, wherein the processor is configured to detect that the first network connection has been temporarily lost by detecting that all network connectivity to the onboard vehicle computer has been temporarily lost and, in response thereto, simulating to the third-party application over the second network connection that the first network connection is still active.

24. The computer program product of claim 15, wherein the processor executable program code to detect that the first network connection has been temporarily lost comprises processor executable program code to detect that all network connectivity to the onboard vehicle computer has been temporarily lost and, in response thereto, simulating to the third-party application over the second network connection that the first network connection is still active.

* * * * *